United States Patent Office 2,782,237
Patented Feb. 19, 1957

2,782,237
MANUFACTURE OF ALIPHATIC PRIMARY AMINES

Frank Hindley and James Wotherspoon Fisher, Spondon, near Derby, England, assignors to British Celanese Limited, a British company No Drawing. Application March 13, 1953,
Serial No. 342,295

Claims priority, application Great Britain March 17, 1952

10 Claims. (Cl. 260—585)

This invention relates to the manufacture of aliphatic primary amines by the reaction of an aliphatic alcohol with ammonia.

According to the invention, an aliphatic monohydric alcohol is heated with more than an equimolecular quantity of ammonia in the presence of a hydrogenating catalyst at a temperature above 170° C. under a pressure sufficient to keep the alcohol in the liquid phase.

The process of the invention is especially applicable to the manufacture of primary lower aliphatic amines, i. e. primary amines containing 1–5 carbon atoms in the molecule, from lower aliphatic alcohols such as methanol, ethanol and the butanols, but it is useful also for making amines of higher molecular weight, for example amines containing up to 10 or 15 carbon atoms in the molecule. The invention is limited to the amination of monohydric alcohols, and does not include the reaction of ammonia with glycols and other polyhydric alcohols such as ethylene glycol, the propylene glycols, the butylene glycols, and diethylene glycol, since with these reactants ring-formation takes place and the yields of primary amines are not satisfactory and may be negligible. For the sake of brevity, the invention will be more particularly described by reference to the manufacture of n-butylamine from butanol-1.

In the prefered method of carrying out the invention, the butanol and catalyst are introduced into an autoclave provided with a high speed stirrer or other means whereby liquids and gases in the autoclave can be intimately mixed. The air is then pumped out of the autoclave, and the desired amount of liquid or gaseous ammonia is fed in, under pressure if necessary. Water is preferably absent. The autoclave is then heated to the desired reaction temperature. The reaction is usually complete in a few hours, and the autoclave may then be cooled, unreacted ammonia blown off, and the liquid contents treated to separate the monobutylamine formed from unchanged butanol, and from any di- or tri-butylamine that may also have been formed.

The molecular ratio of ammonia to butanol at the beginning of the reaction need not be much above unity, even when it is desired to reduce the proportion of dibutylamine formed to a very low figure. (Formation of tributylamine is generally negligible.) For example the ratio may be between about 1.1:1 and 1.5:1, the higher values being preferable at higher temperatures as explained below. Ratios above 1.5:1 can be used, but entail either the generation of higher pressure or the use of a smaller quantity of butanol for a given volume of reaction space.

The temperature used is preferably between 185° and 220° C., and especially about 190°–210° C. The higher the temperature, the higher is the total conversion of alcohol to amine, other things being equal, but also the higher is the proportion of dibutylamine formed. It is for this reason that, as stated above, the ratio of ammonia to butanol is preferably greater at higher temperatures than at lower temperatures; for example when working at 210°–220° C., the molecular ratio may be between about 1.4:1 and 1.5:1, while at 185°–190° C. it may be between about 1.1:1 and 1.2:1 or even lower.

As the catalyst we prefer to use an actively catalytic form of nickel, and especially Raney nickel, but we may use other hydrogenation catalysts, for example a cobalt, iron, copper chromite or nickel chromite catalyst. Quite small amounts of catalysts are sufficient, e. g. about 1–6% of Raney nickel, reckoned on the weight of the butanol.

We have found that when aminating primary alcohols by the present process, especially when using an ammonia:alcohol ratio and temperatures such that about 5% or more of the alcohol employed is normally converted into secondary amine, the addition of a small proportion only of the corresponding secondary amine to the alcohol before the reaction is started has a surprisingly large effect in improving the conversion to primary amine and decreasing the conversion to secondary amine. Thus in the amination of butanol-1, about 0.02–0.1, and especially 0.025–0.06, molecular proportions of dibutylamine may be added for each molecular proportion of butanol. As a result of the small proportion of dibutylamine needed, the proportion of dibutylamine in the products of the process is small, even though it appears likely that little or none of the added dibutylamine is actually converted to monobutylamine. If larger proportions of dibutylamine are added, for example 1–3 molecular proportions for each molecular proportion of the butanol, a still higher conversion to monobutylamine is obtained and the formation of dibutylamine may be completely suppressed, but substantially all the added dibutylamine appears in the product.

The liquid products of the reaction may be worked up in any suitable way. For example they may be filtered free from catalyst, dried for instance with solid caustic soda, and fractionally distilled to separate monobutylamine from unchanged butanol and from such dibutylamine as may be present.

Conditions similar to those given above may be employed in the conversion of other aliphatic monohydric alcohols, especially alcohols containing 1–5 carbon atoms in the molecule, to the corresponding primary amines.

The invention is illustrated by the following examples. The "parts" given are parts by weight.

Example I 4000 parts of butanol and 200 parts of Raney nickel were introduced into an autoclave provided with a high speed propeller stirrer; the air was then pumped from the autoclave and 1200 parts of liquid ammonia were run in. The stirrer was started and the autoclave was heated to 195° C. for 7 hours, and allowed to cool again. Unreacted ammonia was then blown off, and the liquid product dried with solid caustic soda and fractionally distilled. Monobutylamine was obtained at a conversion of 53.2% on the butanol; substantially no dibutylamine was formed.

Example II 3700 parts of butanol and 100 parts of Raney nickel were introduced into the same autoclave, the air was pumped out and 1150 parts of liquid ammonia fed in. The stirrer was started, and the autoclave heated to 205° C. for 7 hours. After the autoclave had cooled again, unchanged ammonia was blown off and the liquid product was filtered, dried and fractionated as in Example I. The conversion to monobutylamine was 53.6% and that to dibutylamine 6.0%, both based on the butanol.

Example III

The process of Example II was repeated, except that the butanol contained initially 322 parts of dibutylamine, 150 parts of catalyst were used, and the autoclave was heated to 200° C. The conversion to monobutylamine was 61.4%, and to dibutylamine only 3.1%.

Having described our invention what we desire to secure by Letters Patent is:

1. Process for the manufacture of aliphatic primary amines containing at the most only small quantities of secondary amines, which comprises heating a reaction system consisting of one molecular proportion of a substantially anhydrous aliphatic alcohol, 1.1–1.5 molecular proportions of ammonia, 0–0.1 molecular proportions of the secondary amine corresponding to the alcohol, and a hydrogenating catalyst selected from the group which consists of nickel, cobalt, iron, copper chromite and nickel chromite catalysts, to a temperature of 170°–220° C. under a pressure sufficient to keep the alcohol in the liquid phase.

2. Process for the manufacture of aliphatic primary amines having 1–5 carbon atoms in the molecule containing at the most only small quantities of secondary amines, which comprises heating a reaction system consisting of one molecular proportion of a substantially anhydrous aliphatic alcohol containing 1–5 carbon atoms in the molecule, 1.1–1.5 molecular proportions of ammonia, 0–0.1 molecular proportions of the secondary amine corresponding to the alcohol, and a hydrogenating catalyst selected from the group which consists of nickel, cobalt, iron, copper chromite and nickel chromite catalysts, to a temperature of 170°–220° C. under a pressure sufficient to keep the alcohol in the liquid phase.

3. Process according to claim 1, wherein the reaction system is heated to 185°–220° C.

4. Process according to claim 2, wherein the reaction system is heated to 185°–220° C.

5. Process according to claim 4, wherein the hydrogenating catalyst is Raney nickel.

6. Process for the manufacture of n-butylamine containing at the most a small proportion of dibutylamine, which comprises heating a reaction system consisting of one molecular proportion of substantially anhydrous n-butanol, 1.1–1.5 molecular proportions of ammonia, 0–0.1 molecular proportions of dibutylamine, and a hydrogenating catalyst selected from the group which consists of nickel, cobalt, iron, copper chromite and nickel chromite catalysts, to a temperature of 190°–210° C. under a pressure sufficient to keep the n-butanol in the liquid phase.

7. Process according to claim 6, wherein the catalyst is Raney nickel.

8. Process according to claim 3, wherein the reaction system contains 0.02–0.1 molecular proportions of the secondary amine corresponding to the alcohol.

9. Process according to claim 5, wherein the reaction system contains 0.02–0.1 molecular proportions of the secondary amine corresponding to the alcohol.

10. Process according to claim 7, wherein the reaction system contains 0.025–0.06 molecular proportions of dibutylamine.

References Cited in the file of this patent

UNITED STATES PATENTS

| Re. 19,632 | Arnold | July 9, 1935 |
| 2,012,333 | Arnold | Aug. 27, 1935 |
| 2,636,902 | Taylor et al. | Apr. 28, 1953 |

OTHER REFERENCES

Merz et al., Ber. 17, 623–40 (1884).
Sabatier et al.: Compt. rend. 148, 898 (1909).